United States Patent
Straily

(10) Patent No.: US 11,231,085 B1
(45) Date of Patent: Jan. 25, 2022

(54) LOW TENSION BELT DRIVE MECHANISM

(71) Applicant: Eric Straily, Arvada, CO (US)

(72) Inventor: Eric Straily, Arvada, CO (US)

( * ) Notice: Subject to any disclaimer, the term of this patent is extended or adjusted under 35 U.S.C. 154(b) by 345 days.

(21) Appl. No.: 16/524,031

(22) Filed: Jul. 27, 2019

(51) Int. Cl.
*F16G 1/28* (2006.01)
*B65G 23/44* (2006.01)

(52) U.S. Cl.
CPC ............... *F16G 1/28* (2013.01); *B65G 23/44* (2013.01)

(58) Field of Classification Search
CPC . F16H 55/38; F16H 7/02; F16H 7/023; F16H 2007/185; F16H 7/00; F16H 7/08
USPC .................................. 474/100, 85, 84
See application file for complete search history.

(56) References Cited

U.S. PATENT DOCUMENTS

| | | | | |
|---|---|---|---|---|
| 114,341 A * | 5/1871 | Randolph | ......... | F16H 7/02 15/230 |
| 410,367 A * | 9/1889 | Lough | ......... | F16H 7/06 474/85 |
| 418,775 A * | 1/1890 | Wall | ......... | F16H 7/06 474/85 |
| 634,800 A * | 10/1899 | Brown | ......... | D01B 1/08 19/55 R |
| 1,615,544 A * | 1/1927 | Miller | ......... | B61D 43/00 474/85 |
| 1,921,749 A * | 8/1933 | Haug | ......... | B62D 55/12 474/85 |
| 1,955,813 A * | 4/1934 | Klappenecker | ......... | G11B 15/26 226/171 |
| 2,195,105 A * | 3/1940 | Watt | ......... | B27M 3/20 474/85 |
| 2,696,678 A * | 12/1954 | Deck | ......... | D06C 15/06 34/60 |
| 2,747,420 A * | 5/1956 | Beck | ......... | G09F 11/24 474/85 |
| 2,875,624 A * | 3/1959 | Lathrop | ......... | F16H 7/00 474/100 |
| 3,459,459 A * | 8/1969 | Eilers | ......... | B62D 55/125 305/33 |
| 3,863,513 A * | 2/1975 | Schnettler | ......... | F16H 7/02 226/172 |
| 3,949,573 A * | 4/1976 | Jacobsson | ......... | B65H 51/105 66/132 T |
| 3,965,764 A * | 6/1976 | Avramidis | ......... | F16H 7/02 474/85 |
| 4,524,654 A * | 6/1985 | Lucey | ......... | B23B 3/30 29/38 B |
| 4,571,220 A * | 2/1986 | Nakano | ......... | F16H 7/00 474/100 |

(Continued)

*Primary Examiner* — Henry Y Liu
(74) *Attorney, Agent, or Firm* — Shifrin Patent Law; Dan Shifrin

(57) ABSTRACT

A low tension belt drive system, comprising a first pulley driven by a drive mechanism; a drive belt connected between a second pulley and the first pulley, the drive belt having an inner surface in contact with the first and second pulleys; a load belt connected between the drive belt and a driven load, a portion of the load belt having an inner surface contacting an outer surface of the drive belt; and an idler belt having a surface a portion of which is in contact with an outer surface of the load belt, whereby the idler belt is biased against the load belt. Increased friction reduces or eliminates slippage between the load belt and the drive belt while removing the need for a tensioned or toothed load belt in order to move accurately and repeatedly.

6 Claims, 4 Drawing Sheets

(56) References Cited

U.S. PATENT DOCUMENTS

| | | | | |
|---|---|---|---|---|
| 4,634,403 | A | * | 1/1987 | Peabody ................ F16H 9/02 474/1 |
| 4,655,733 | A | * | 4/1987 | Jonason ................ F16G 5/16 474/206 |
| 5,041,063 | A | * | 8/1991 | Breher ................ F16G 1/28 474/205 |
| 5,415,592 | A | * | 5/1995 | Hoyt ................ F16H 7/023 474/141 |
| 5,762,575 | A | * | 6/1998 | Vahabzadeh ............ F16H 7/06 474/78 |
| 5,778,287 | A | * | 7/1998 | Yu ................ G03G 15/757 399/162 |
| 5,919,333 | A | * | 7/1999 | Maltby ............ B65H 23/105 156/425 |
| 6,086,494 | A | * | 7/2000 | Crosta ................ F16H 7/24 474/88 |

* cited by examiner

LOW TENSION BELT DRIVE MECHANISM

TECHNICAL FIELD

Embodiments of the present invention relate generally to apparatus and methods for providing mechanical power to driven devices and, in particular, to driving such devices with a low tension belt mechanism.

BACKGROUND ART

Moving objects or devices using belts (or equivalently, using chain, rope, cable, etc.) is a common occurrence throughout many industries. However, to gain precise control of speed, positioning, and repeatability the belt has to either have teeth or be under significant tension. For example, when a belt doesn't have teeth or some other indexing feature, positioning uncertainty is introduced as the belt moves back and forth. Belts with teeth are generally more expensive than flat belts and may not be available in lengths as long as are available for flat belts.

Materials that can support higher tensions are generally more expensive than those that can only support lower tensions. And, in some instances, higher tension in a long belt may increase safety hazards. Additionally, structures that can support high tension are also generally more expensive, especially as they scale up in size.

SUMMARY OF THE INVENTION

Embodiments of the present invention provide a belt drive system that increases the friction force between a drive belt (strap/webbing/flat belt/tooth belt/rope/cable) and its drive mechanism (motor shaft/pulley/gear/belt system). Utilizing an externally applied force (such as rollers/wheels, external belt loop, gas/liquid pressure or magnetism) the drive belt is pressed against the drive mechanism to increase the friction force. This increased friction reduces or eliminates slippage between the drive belt and the drive mechanism while removing the need for a tensioned or toothed drive belt in order to move accurately and repeatedly.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
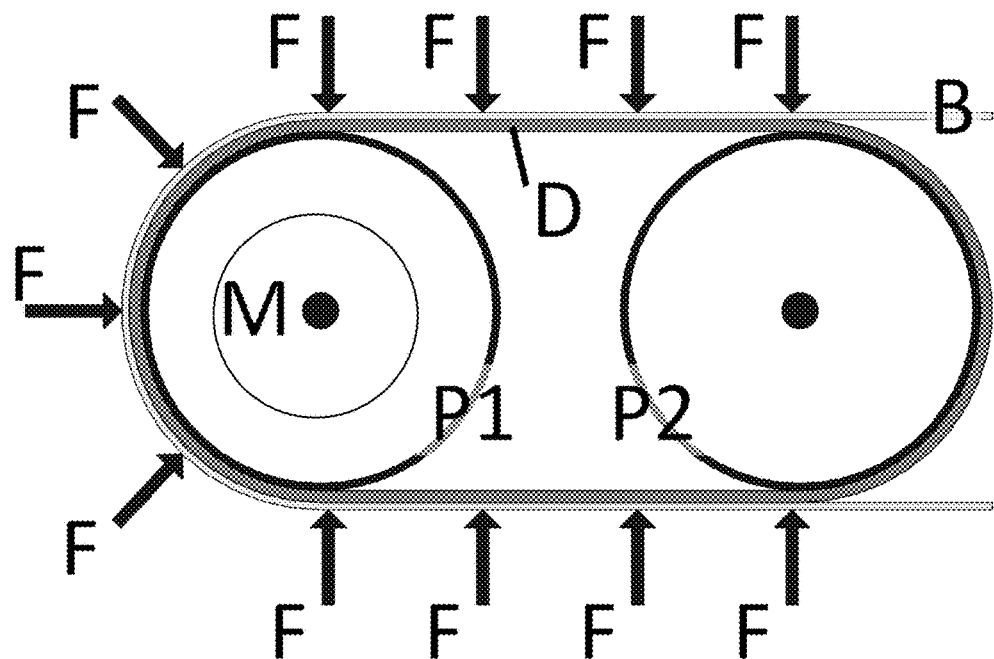
FIG. 1 represents a force diagram illustrating principles on which embodiments of belt drives of the present invention are based.

FIG. 1 represents a force diagram illustrating principles on which embodiments of belt drive systems of the present invention are based. Illustrated are a motor M, which drives a pulley P1, an idler pulley P2, the pulleys are encircled by a drive belt D, and a load belt B which is driven by the drive belt D. To reduce slippage between drive belt D and load belt B without increasing the load belt B tension or adding an indexing feature to the drive belt D and load belt B interface, the frictional force F must be increased along the contact area between the drive belt D and the load belt B.

Figure 2:
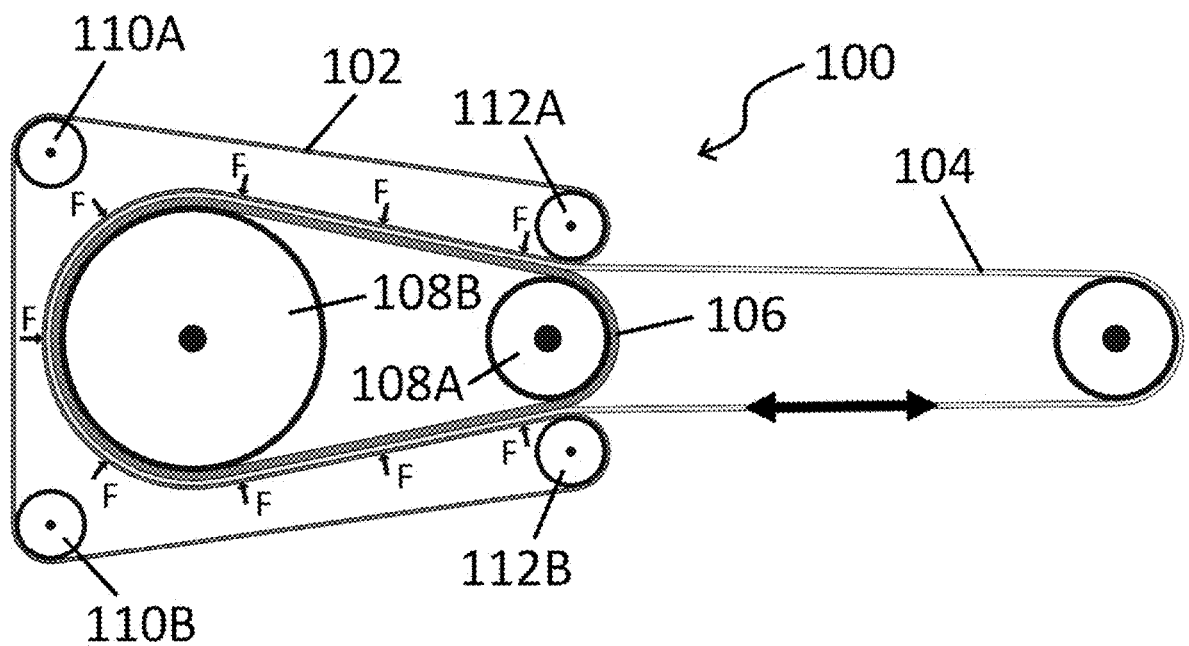
FIG. 2 is a schematic representation of an embodiment of a belt drive of the present invention.

FIG. 2 illustrates an embodiment of a belt drive system 100 of the present invention in which an idler belt 102 is used to apply a force F to press the load belt 104 to the drive belt 106 that is driven by the motor shaft/pulleys 108A/108B (hereinafter referred to as the drive pulleys 108) to drive a load (not shown). A portion of the surface of the idler belt 102 is in contact with a portion of the outer surface of the load belt 104, and a portion of the inner surface of the load belt 104 is in contact with a portion of the outer surface of the drive belt 106. Thus, at least a portion of the load belt 104 is sandwiched between the idler belt 102 and the drive belt 106. When the idler belt is tensioned the resultant increase in the force F increases the friction between the load belt 104 and the drive belt 106, thereby reducing or even preventing slippage. The inner surface of the drive belt 106 is in contact with a portion of the drive pulleys 108, one of which is driven while the other is an idler. Drive belt 106 may be under tension and/or the drive belt 106 and drive pulleys 108 may have an indexing feature to prevent slippage. The diameter of one or both of the drive pulleys 108 may be enlarged to increase the contact length with drive belt 106 and therefore the resultant contact length between the drive belt 106 the load belt 104.

The system 100 also includes a series of pulleys or rollers 110A, 110B (collectively 110) and 112A, 112B (collectively 112). Two of the pulleys 110A, 110B may be positioned adjacent to (behind) one side of drive pulley 108A. The other two pulleys 112A, 112B may be positioned adjacent to (in front of) the opposite side of the drive pulley 108B. The idler belt 102 may be wrapped around, in order, the pulley 110A and the pulley 112A, back around the drive pulley 108B, and then the pulley 112B and the pulley 110B, forming a completed loop. The pulleys 112A, 112B are biased to press the load belt 104 between the idler belt 102 and the drive belt 106. In one embodiment, the pulleys 112A, 112B are substantially aligned linearly with the drive pulley 108A, as illustrated in FIG. 2.

For example, the idler belt 102 may be tensioned in a conventional manner to increase the friction force. Alternatively, gas/fluid pressure may be directed onto the load belt 104 to press it to the drive belt 106 if the additional rotational drag introduced by wheel/rollers 110/112 and idler belt 102 is undesirable. Magnetism may also be used either by having magnets at intervals along the idler belt 102 which are attracted to the drive pulley 108B or by magnetizing the drive pulley 108B and having magnetic characteristics added to the load belt 104 or idler belt 102.

In alternative embodiments, additional pulleys 110 may be used to hold the idler belt 102 away from the drive pulley 108B and the belts wrapped around it. Additional pulleys 112 may also be used to press the idler belt 102 against the load belt 104 in-between the drive pulley 108A and the drive pulley 108B. In alternative embodiments, the idler belt 102 may be pressed against the load belt 104 in only a single location or, as illustrated, in multiple locations.

Figure 3:
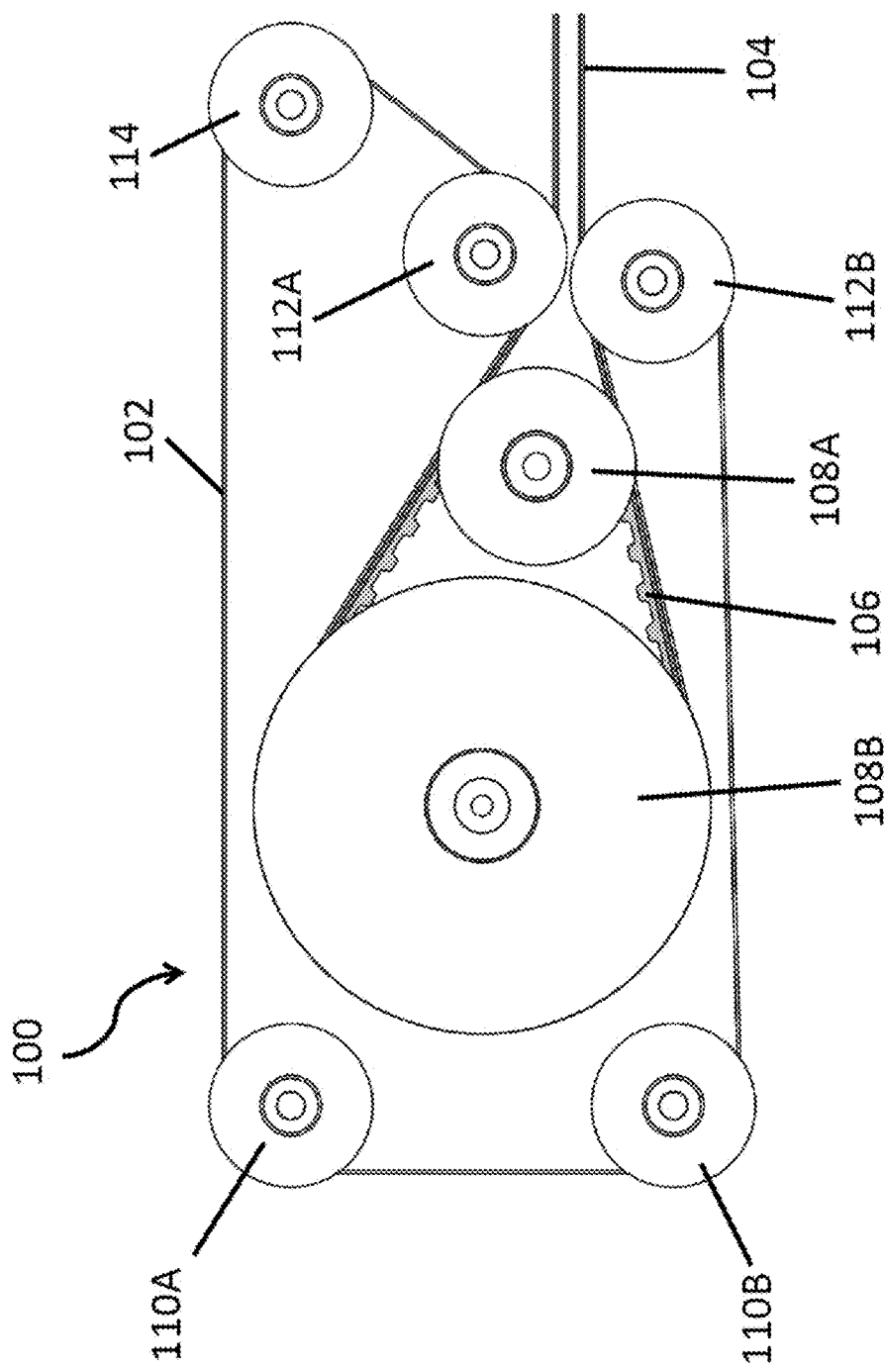
FIG. 3 is a side view of another embodiment of a belt drive of the present invention.

FIG. 3 illustrates a variation of the embodiment of FIG. 2. While the pulleys 110A, 110B remain behind the drive pulley 108B, the two pulleys 112A, 112B are now positioned beyond (in front of) the drive pulley 108A and are aligned in a substantially triangular configuration. Depending on the distance between the drive pulley 108B and the pulleys 112A, 112B, the distance over which the idler belt 102 is in contact with the load belt 104 may be increased, thereby increasing the surface area of the load belt 104 against which the force F is applied by the idler belt 102. The embodiment of FIG. 3 also includes still another pulley 114 holding the idler belt 102 beyond (in front of) and above the pulleys 112A, 112B. A corresponding pulley (not shown) may be included to hold the idler belt 102 beyond and below the pulleys 112A, 112B. If desired, the drive belt 106 and the drive pulleys 108A/108B may have teeth to reduce slippage between them. Alternatively, pulleys 108A and 108B can be used to tension drive belt 106 to reduce slippage between them. The drive belt 106 is short relative to the load belt 104 and having teeth or providing structure for tensioning does not significantly increase the cost of the system 100.

Figure 4:
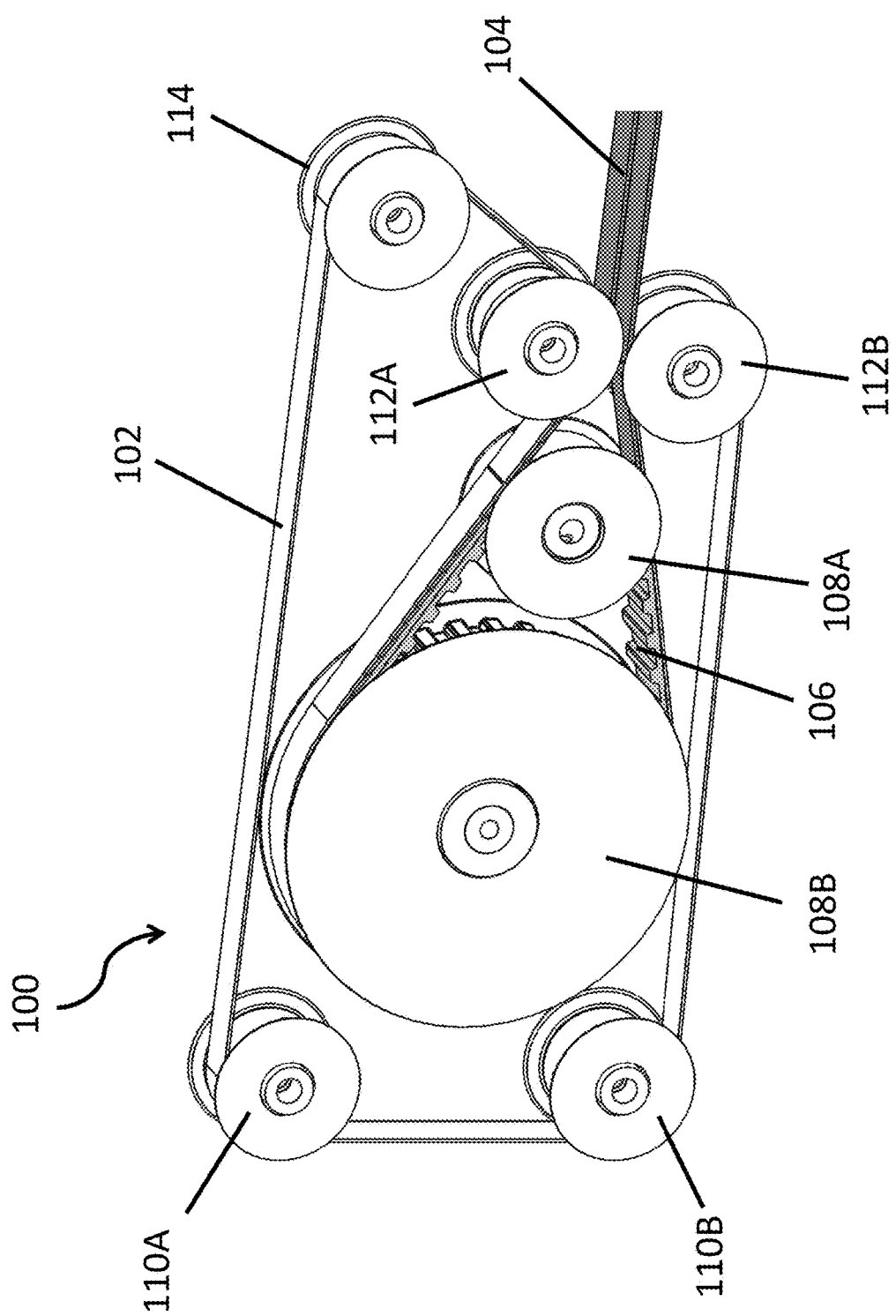
FIG. 4 is a perspective view of the embodiment of FIG. 3.
Figure 5:
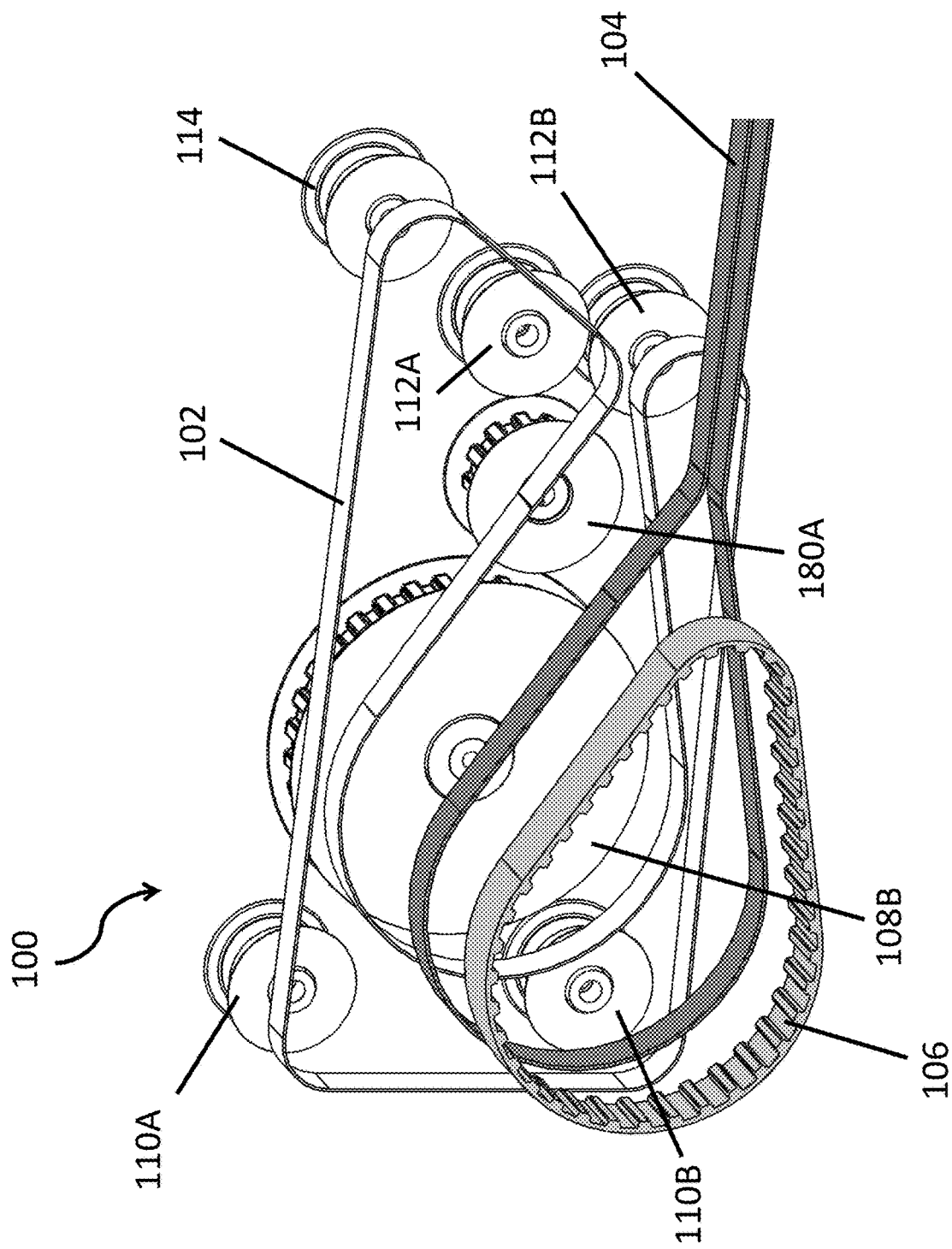
FIG. 5 is a exploded view of the embodiment of FIG. 3.

FIGS. 4 and 5 are perspective and exploded views of the belt drive system of FIG. 3 more clearly illustrating the configuration of the idler belt 102, the load belt 104, and the drive belt 106 and the pulleys 108, 110, 112, 114.

The description of the present invention has been presented for purposes of illustration and description, but is not intended to be exhaustive or limited to the invention in the form disclosed. Many modifications and variations will be apparent to those of ordinary skill in the art, including other configurations of belts and pulleys. The embodiment was chosen and described in order to best explain the principles of the invention, the practical application, and to enable others of ordinary skill in the art to understand the invention for various embodiments with various modifications as are suited to the particular use contemplated.

What is claimed is:

1. A low tension belt drive system, comprising:
   a first pulley driven by a drive mechanism;
   a drive belt connected between a second pulley and the first pulley, the drive belt having an inner surface in contact with the first and second pulleys;
   a load belt encircling the drive belt and connected to a driven load, a portion of the load belt having an inner surface contacting an outer surface of the drive belt; and
   an idler belt having a surface of which a portion is in contact with an outer surface of the load belt, whereby the idler belt is biased against the load belt.

2. The system of claim 1, further comprising:
   a pair of third pulleys around which the idler belt is wrapped, the third pulleys located on opposite sides of the drive belt and biased to cause a friction force between the inner surface of the load belt and the outer surface of the drive belt.

3. The system of claim 1, further comprising:
   a single or pair of fourth pulley(s) around which the idler belt is wrapped, the fourth pulley(s) located away from the load belt and positioned to cause clearance between the inner surfaces of the idler belt where the idler belt is biased against the load belt.

4. The system of claim 1, wherein the drive belt is formed with teeth on the inner surface.

5. The system of claim 1, wherein gas/fluid pressure biases the idler belt against the load belt.

6. The system of claim 1, wherein a plurality of magnets biases the idler belt against the load belt.

\* \* \* \* \*